US010848809B1

(12) United States Patent
Yu et al.

(10) Patent No.: US 10,848,809 B1
(45) Date of Patent: *Nov. 24, 2020

(54) COMPUTATION OF VIDEO PRESENTATION STATISTICS IN AN ONLINE SYSTEM

(71) Applicant: Facebook, Inc., Menlo Park, CA (US)

(72) Inventors: Jiajin Yu, Redwood City, CA (US); Max K. Comer, San Francisco, CA (US); Zhengyong Zhu, Saratoga, CA (US); Kevin Wenkai Heh, San Jose, CA (US); Spencer Powell, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/440,578

(22) Filed: Jun. 13, 2019

Related U.S. Application Data

(63) Continuation of application No. 15/586,878, filed on May 4, 2017, now Pat. No. 10,390,065.

(51) Int. Cl.
| *H04N 21/258* | (2011.01) |
| *H04N 21/24* | (2011.01) |
| *H04N 21/235* | (2011.01) |
| *H04N 21/2668* | (2011.01) |
| *H04N 21/442* | (2011.01) |

(52) U.S. Cl.
CPC ... *H04N 21/25866* (2013.01); *H04N 21/2353* (2013.01); *H04N 21/2407* (2013.01); *H04N 21/2668* (2013.01); *H04N 21/44204* (2013.01)

(58) Field of Classification Search
CPC ......... H04N 21/25866; H04N 21/2353; H04N 21/2407; H04N 21/2668; H04N 21/44204
See application file for complete search history.

(56) References Cited

U.S. PATENT DOCUMENTS

| 9,747,618 | B1 | 8/2017 | Reiss |
| 2007/0271145 | A1 | 11/2007 | Vest |
| 2007/0288953 | A1 | 12/2007 | Sheeman et al. |
| 2008/0244639 | A1 | 10/2008 | Kaaz |
| 2008/0275753 | A1 | 11/2008 | Protheroe et al. |
| 2008/0275777 | A1 | 11/2008 | Protheroe et al. |
| 2016/0042407 | A1 | 2/2016 | Els et al. |
| 2016/0071162 | A1* | 3/2016 | Ogawa ............... G06Q 30/0269 705/14.66 |

(Continued)

*Primary Examiner* — James R Sheleheda
*Assistant Examiner* — Franklin S Andramuno
(74) *Attorney, Agent, or Firm* — Fenwick & West LLP

(57) ABSTRACT

An online system receives a video-presentation request from a third party system. The video-presentation request comprises a video and a target audience specification for the video. The online system selects a plurality of users as the target audience of the video based on the target audience specification. From the target audience, the online system generates a sample subset of users and determines a sampled video reach count for the subset of users. A sample user who, as determined by the online system, would have viewed the view for at least a threshold duration, is included in the sampled video view count. The online system estimates a total video reach count for target audience by extrapolating the sampled video reach count for the subset of users to the target audience. The total video reach count can be used to determine a parameter for presenting the video on an online system.

20 Claims, 9 Drawing Sheets

(56) References Cited

U.S. PATENT DOCUMENTS

2016/0292714 A1   10/2016  Bhalgat et al.
2017/0238046 A1    8/2017  Kerns et al.
2017/0352052 A1   12/2017  Law et al.
2018/0046637 A1*  2/2018  Koopman ............... H04L 67/22

* cited by examiner

| No. 410 | ID 420 | Feature 430 | Standard Deviation 440 | Mean 450 | Coverage 460 | Importance 470 |
|---|---|---|---|---|---|---|
| 1 | 1914 | USER_AUTO_PLAY_SEASONAL_VIDEO_VIEW_IMP_CVR | 0.0564 | 0.0936 | 99.47% | |
| 2 | 10034 | USER_PAGE_TYPE_LEVEL_CVR | 0.0746 | 0.0954 | 99.26% | |
| 3 | 10035 | PAGE/TARGET_LEVEL_CVR | 0.051 | 0.0946 | 82.10% | |
| 4 | 18 | USER_COUNTRY_BUCKET | --- | --- | 100% | |
| 5 | 10002 | PAGE_3S_CVR_90 | 0.0809 | 0.2066 | 89.28% | |
| 6 | 10004 | PAGE_LEGAL_REVENUE_90 | 112028943.2 | 68268894 | 92.32% | |
| 7 | 10036 | PAGE/TARGET_LEVEL_CPM | 2.1002 | 2.4883 | 82.10% | |
| 8 | 10037 | ACCOUNT_LEVEL_VERTICAL | --- | --- | 100% | |
| 9 | 10003 | PAGE_CPM_90 | 0.1827 | 0.228 | 89.28% | |
| 10 | 10001 | PAGE_10S_CVR_90 | 0.0483 | 0.088 | 89.28% | |
| 11 | 19 | USER_AGE_BUCKET | 1.0375 | 2.9993 | 100% | |
| 12 | 1975 | USER_PAGE_CAT_MONTHLY_ORGANIC_OUTBOUND_CTR | 0.0113 | 0.0094 | 100% | |
| 13 | 10033 | PAGE_PAGE_TYPE_LEVEL_CVR | 0.0534 | 0.0901 | 87.50% | |
| 14 | 187 | NEW_PAGE_TYPE | --- | --- | 100% | |
| 15 | 1493 | USER_PAGETYPE_CAT_WEEKLY_ONSCREEN_IMP | 241.9927 | 287.5195 | 99.05% | |
| 16 | 1887 | USER_AUTO_PLAY_IMP_CVR_MONTHLY | 0.1732 | 0.118 | 100% | |
| 17 | 902 | USER_PAGETYPE_CAT_CONVTYPE_MONTHLY_IMP | 310.8867 | 329.2077 | 99.51% | |

FIG. 4

Historical Video Views of User A 800

| Historical Video View | Duration of Video View (sec) | Threshold Duration (sec) | Included in Individual View Value |
|---|---|---|---|
| a | 5 | 15 | N |
| b | 50 | 15 | Y |
| c | 10 | 15 | Y |
| d | 100 | 15 | Y |
| e | 60 | 15 | Y |
| f | 2 | 15 | N |
| g | 20 | 15 | Y |
| h | 6 | 15 | N |

Video View Value Calculation 850

| User | A | B | C | D | E |
|---|---|---|---|---|---|
| Individual View Value | 5 | 12 | 7 | 8 | 10 |

Video View Value = 42

FIG. 8

COMPUTATION OF VIDEO PRESENTATION STATISTICS IN AN ONLINE SYSTEM

CROSS REFERENCE TO RELATED APPLICATIONS

This application is a continuation of co-pending U.S. application Ser. No. 15/586,878, filed May 4, 2017, which is incorporated by reference in its entirety.

BACKGROUND

This disclosure relates generally to online systems, and in particular to view prediction of videos presented by online systems.

Certain online systems, such as social networking systems, allow their users to connect to and to communicate with other online system users. Users may create profiles on such an online system that are tied to their identities and include information about the users, such as interests and demographic information. The users may be individuals or entities such as corporations or charities. Because of the increasing popularity of these types of online systems and the increasing amount of user-specific information maintained by such online systems, an online system provides an ideal forum for third party systems to increase awareness about products or services to online system users. For example, the online system can present content items, e.g., videos, received from a third party system to users of the online system.

In some cases, content providers must spend money to provide videos and other content items to online system users, and they may have a limited budget. Yet, conventional systems do not provide a way for content providers to know that they will receive an acceptable number of views of their videos by users for their budget to meet their goals reaching enough users with the content. Further, content providers often do not have clear insight into how much to spend to get a sufficient number of views.

SUMMARY

Embodiments described herein include methods, systems and computer program readable storage medium storing executable computer program instructions to provide solutions for view prediction of content, such as videos, presented by online systems.

One embodiment includes a method for estimating a total video reach count for target audience of a video received from a third party system. This allows for determination of an amount that the third party system should pay to guarantee delivery of a certain number of video views, and allows the third party system to deplete all or most of the third party system's budget for presenting the video to users. In the embodiment, the online system receives a video-presentation request from the third party system. The video-presentation request comprises the video and a target audience specification (e.g., definition of the target audience, such as all males 18-20), and in some cases a bid from the third party and a number of days that the third party would like to run the campaign associated with the content. The online system may also mine historical video views across users that match the target audience specification. Specifically, the system accesses metadata of its users and selects a plurality of users that meet the target audience specification as the target audience of the video. At least part of the metadata of the selected users matches the target audience specification from the third party system. The online system generates a sample subset of users from the target audience of the video based on a sampling criterion. In one embodiment, the sampling criterion is predetermined, including a specified sampling rate of 1/M, where M is an integer or positive rational number.

The online system determines a sampled video reach count for the sampled users in the subset, e.g., based on historical views of various past videos by the users. In one embodiment, the sampled video reach count equals to the number of sampled users who, as determined by a video view prediction model trained by a machine learning module, would have viewed the third party system's video for at least a threshold duration if they were presented with the video. The online system estimates the total video reach count by extrapolating the sampled video reach count for the sampled users in the subset to the target audience. For example, the total video view is the product of the sampled video reach count multiplied by M (the inverse of the sampling rate). The online system further determines a parameter of presenting the new video from the third party based on the total video view count, such as a population size of the audience for the video. In some embodiments, the online system sends the total video reach count to the third party system for an adjustment in the video-presentation request or other parameters.

The total video reach count indicates the number of online system users, who, if presented the video from the third party, will likely play the video, as opposed to merely skipping it or unintentionally accessing the video. And the online system can strategize presentation of the video accordingly.

BRIEF DESCRIPTION OF THE DRAWINGS

FIG. 4 shows a list of features extracted by a machine learning module of the video view prediction module, in accordance with an embodiment.

FIG. 8 is an example illustration showing generation of a video view value for a video by aggregating individual view values of a group of users who have played the video, in accordance with one embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
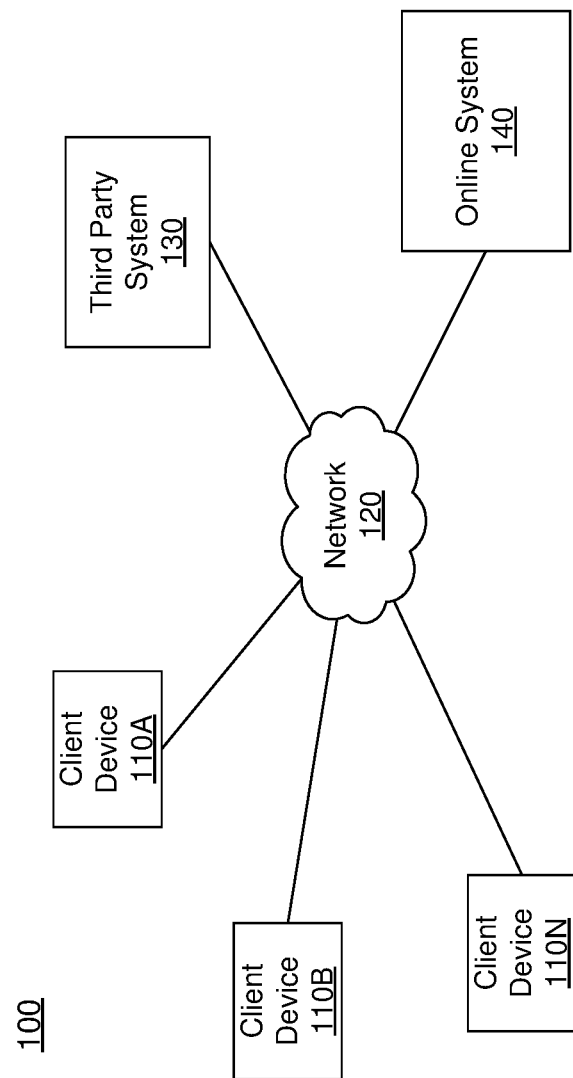
FIG. 1 is a block diagram of a system environment in which an online system operates, in accordance with an embodiment.

FIG. 1 is a block diagram of a system environment 100 in which an online system 140 operates, in accordance with an embodiment. The system environment 100 shown by FIG. 1 comprises client devices 110A-N, a network 120, a third-party system 130, and the online system 140. Embodiments of the system environment 100 can have multiple third party systems 130. Likewise, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™. A client device 110 includes or is otherwise associated with a player that enables a user of the client device 110 to play videos presented by the online system 140. The client device 110 can also allow the user to stop, skip, block or fast forward a video presented by the online system 140. A client device 110 can further provide to the online system 140 video play statistics. The video play statistics include information indicating which videos were played on the client device 110, how long a video was played, what time a video was played, and so on.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), delivery control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

The third party system 130 is coupled to the network 120 for communicating with the online system 140, which is further described below in conjunction with FIG. 2. The third party system 130 sends video-presentation requests to the online system 140 via the network 120. A video-presentation request comprises a video for presentation by the online system 140 and a target audience specification. In some embodiments, the video-presentation request further includes a video presentation period. The third party system 130 may also communicate other information to the online system 140, such as a compensation value for presenting the video by the online system 140 (i.e., a video presentation compensation value). In one embodiment, the third party system 130 receives information from the online system 140 in response to a video-presentation request, including an estimated video reach count for the video in the video-presentation request, a total video view value for the video, or other parameters for presenting the video by the online system 140.

Online System Architecture

Figure 2:
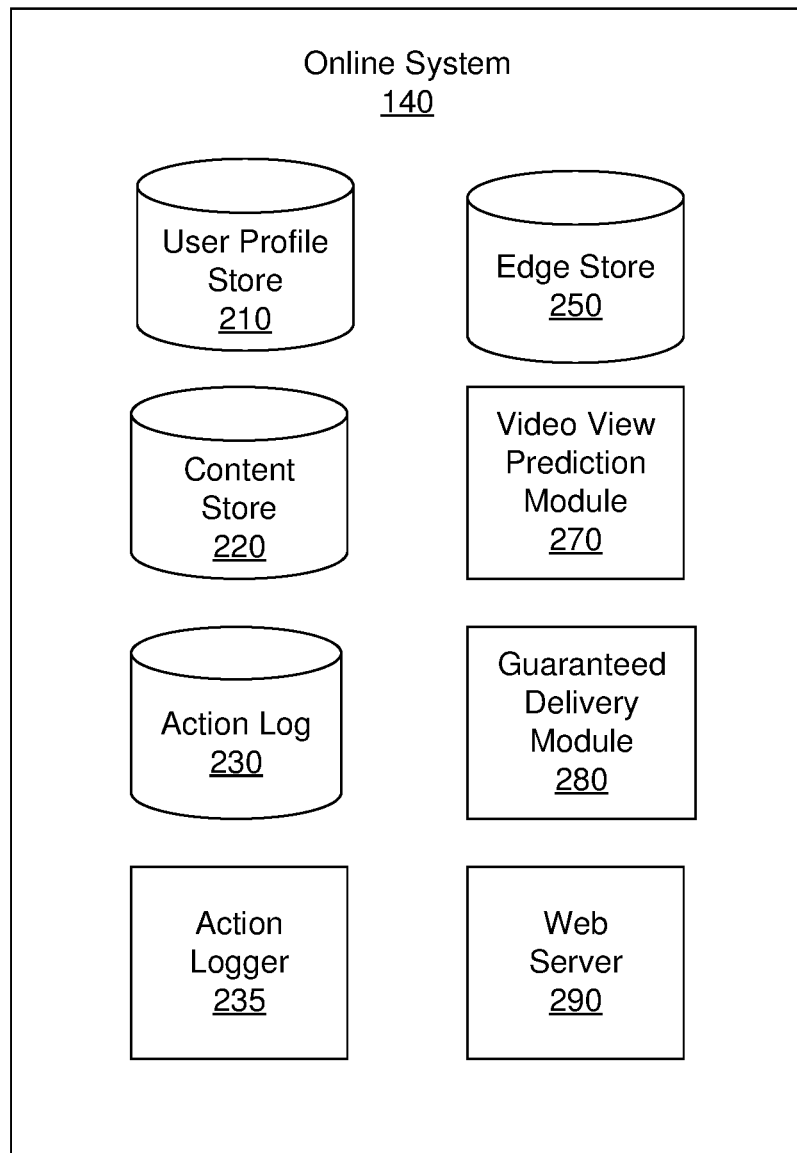
FIG. 2 is a block diagram illustrating a detailed view of the online system, in accordance with an embodiment.

FIG. 2 is a block diagram illustrating a detailed view of the online system 140, in accordance with an embodiment. The online system 140 shown in FIG. 2 includes a user profile store 210, a content store 220, an action logger 235, an action log 230, an edge store 250, a video view prediction module 270, a guaranteed delivery module 280, and a web server 290. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 210. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 210 may also maintain references to actions by the corresponding user performed on content items stored in the content store 220 and the action log 230.

While user profiles in the user profile store 210 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity. For example, the third party system 130 may be associated with a user profile stored in the user profile store 210.

The content store 220 stores objects. Each object represents various types of content. Examples of content represented by an object include a video (e.g., a video included in a video-presentation request from the third party system 130), a page post, a status update, a photograph, a link, a shared content item, a gaming application achievement, a check-in event at a local business, a brand page, or any other type of content. Online system users may create objects stored by the content store 220, such as status updates, photos tagged by users to be associated with other objects in the online system 140, events, groups or applications.

In one embodiment, objects in the content store 220 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140. In various embodiments, the content also specifies a page of content. For example, a content item includes a landing page specifying a network address of a page of content to which a user is directed when the content item is accessed.

In various embodiments, a content item includes various components capable of being identified and retrieved by the online system 140. Example components of a content item include: a title, text data, image data, audio data, video data, a landing page, a user associated with the content item, or any other suitable information. The online system 140 may retrieve one or more specific components of a content item for presentation in some embodiments. For example, the online system 140 may identify a title and an image from a content item and provide the title and the image for presentation rather than the content item in its entirety.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the individual or entity that provided the content item to the online system 140. One example of targeting criteria is target audience specifications included in video-presentation requests from the third party system 130. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow an individual or entity to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on the third party system 130. For example, targeting criteria identifies users that have taken a particular action, such as sent a message to another user, used an application, joined a group, left a group, joined an event, generated an event description, purchased or reviewed a product or service using an online marketplace, requested information from a third party, installed an application, or performed any other suitable action. Including actions in targeting criteria allows users to further refine users eligible to be presented with content items. As another example, targeting criteria identifies users having a connection to another user or object or having a particular type of connection to another user or object.

Targeting criteria included in a content item request also specify other information with respect to the content item from the provider of the content item. For example, for a video provided by the third party system 130 for presentation at the online system 140, the third party system 130 provides a video presentation period. In some embodiment, the third party system 130 may provider more information regarding video presentation to the online system 140 that is stored in the content store 220, such as video presentation compensation values.

The action logger 235 receives communications about user actions internal to and/or external to the online system 140, populating the action log 230 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 230.

The action log 230 may be used by the online system 140 to track user actions on the online system 140, as well as actions on the third party system 130 that communicate information to the online system 140. Users may interact with various objects on the online system 140, and information describing these interactions is stored in the action log 230. Examples of interactions with objects include: commenting on posts, sharing links, checking-in to physical locations via a client device 110, accessing content items, and any other suitable interactions. Additional examples of interactions with objects on the online system 140 that are included in the action log 230 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 230 may record a user's interactions with content on the online system 140 as well as with other applications operating on the online system 140. For example, the action log 230 records video views of the user, including information indicating which videos were viewed by the user, what time the user viewed each video, and how long the user viewed each video. In some embodiments, data from the action log 230 is used to infer interests or preferences of a user, augmenting the interests included in the user's user profile and allowing a more complete understanding of user preferences.

The action log 230 may also store user actions taken on third party systems, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 230 may record information about actions users perform on a third party system, including webpage viewing histories, content items that were engaged, purchases made, and other patterns from shopping and buying. Additionally, actions a user performs via an application associated with a third party system and executed on a client device 110 may be communicated to the action logger 235 by the application for recordation and association with the user in the action log 230.

In one embodiment, the edge store 250 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 250 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,290, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 250, in one embodiment. Alternatively, each interaction between a user and a specific object is stored as a separate edge. In some embodiments, connections between users may be stored in the user profile store 210, or the user profile store 210 may access the edge store 250 to determine connections between users.

The video view prediction module 270 predicts a total video reach count for each video-presentation request received from the third party system 130. The total video reach count indicates the total number of online system users, who are determined that, if they are presented with the video included in the video-presentation request, would have viewed the video for at least a threshold duration. The video view prediction module 270 selects a plurality of users of the online system 140 as the target audience of the video, based on the target audience specification included in the video-presentation request. From the target audience, the video view prediction module 270 generates a sample subset of users, e.g., according to a predetermined sampling criterion. A sampled video reach count for the sample subset of users is estimated based on a training model. The video view prediction module 270 extrapolates the sampled video reach count for the sample subset of users to the target audience to estimate the total video reach count for the target audience. A parameter for presenting the video is determined based on the total video view count, such as population size of a target audience for the video. More details of the video view prediction module 270 are discussed in conjunction with FIG. 3.

The guaranteed delivery module 280 generates a video view value for each video presented by the online system 140, according to a video-presentation request from the third party system 130. Based on a video-presentation request, the guaranteed delivery module 280 selects a plurality of users of the online system 140 and presents the video to each selected user. In one embodiment, the selected users are filtered based on a determination of likelihood of whether the third party system would have won an impression opportunity presented to the selected users (e.g., based on a bid value provided by the third party system 130). Any users for whom the third party system 130 would not have won an impression opportunity may be filtered out. The determination can be based on historical data of the selected users. For example, the online system 140 may use the prior bid success rate for the third party system 130 for prior presentations of content to users sharing characteristics with the selected users. For each presentation of the video to a selected user, the online system stores the view of the video by the selected user as a historical view. The guaranteed delivery module 280 determines an individual view value for each selected user based on historical views of the selected user. The video view value is generated by aggregating the individual view values of each of the selected users. The guaranteed delivery module 280 applies the generated video view value to modify a pacing of delivery of the video by the online system 140. More details of the guaranteed delivery module 280 and pacing are discussed in conjunction with FIG. 7.

The web server 290 links the online system 140 via the network 120 to the one or more client devices 110 and, as well as to the third party system 130. The web server 290 serves web pages, as well as other content, such as JAVA®, FLASH®, XML and so forth. The third party system 130 may transmit a request to the web server 290 to upload video-presentation requests. Uploaded video-presentation requests are stored in the content store 220 by the online system 140. Likewise, a user may send a request to the web server 290 to upload user information (e.g., images or videos) that are stored in the content store 220. The web server 290 may also receive and route messages between the online system 140 and the client device 110, for example, instant messages, queued messages (e.g., email), text messages, short message service (SMS) messages, or messages sent using any other suitable messaging technique. Additionally, the web server 290 may provide application programming interface (API) functionality to send data directly to native client device operating systems, such as IOS®, ANDROID™, or BlackberryOS. For example, the web server 290 serves videos stored in the content store 220 to the client devices 110 for presenting the videos to online system users. At the same time, the web server 290 may provide a code that allows the client devices 110 to send back video play statistics.

Video View Prediction

Figure 3:
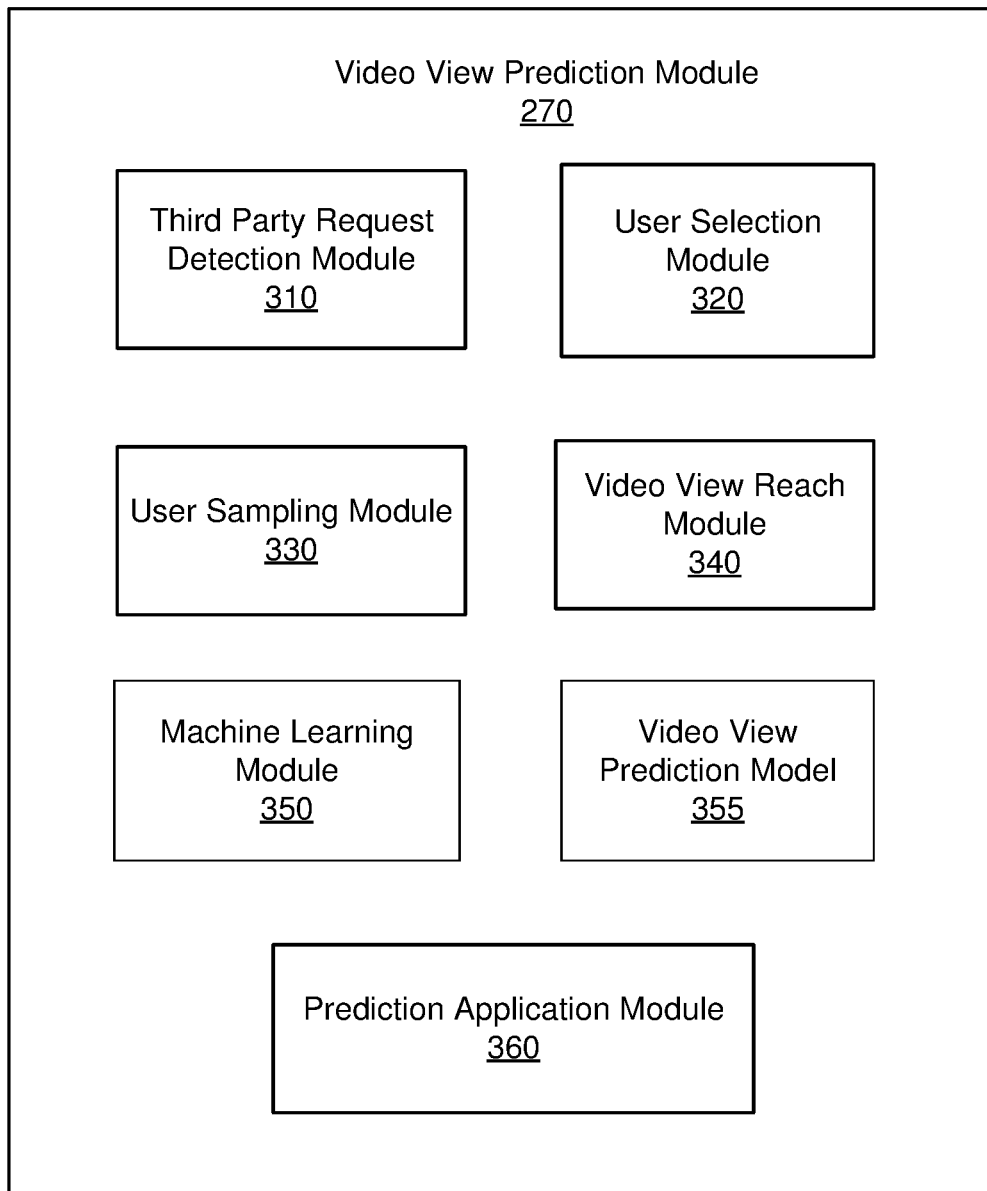
FIG. 3 is a block diagram illustrating a detailed view of a video view prediction module of the online system, in accordance with an embodiment.

FIG. 3 is a block diagram illustrating a detailed view of a video view prediction module 270 of the online system 140, in accordance with an embodiment. The video view prediction module 270 shown in FIG. 3 includes a third party request detection module 310, a user selection module 320, a user sampling module 330, a video reach count module 340, a machine learning module 350, a video view prediction module 355, and a prediction application module 360. In other embodiments, the video view prediction module 270 may include additional, fewer, or different components for various applications. In some embodiments, the functions of the modules are distributed among the modules in a different manner than described herein. Moreover, the functions are performed by other entities in some embodiments.

The third party request detection module 310 detects video-presentation requests from the third party system 130. For example, when the third party system 130 uploads a video-presentation request to the online system 140 through the web server 290, the third party request detection module 310 detects the uploading. After the web server 290 stores the video-presentation request in the content store 220, the third party request detection module 310 retrieves the video-presentation request from the content store 220. The third party request detection module 310 further communicates with one or more other modules of the video view prediction module 270 to process the video-presentation request. For example, the third party request detection module 310 sends the target audience specification to the user selection module 320 for selecting a target audience of the video.

The user selection module 320 selects, based on the target audience specification, a plurality of users of the online system 140 as the target audience of the video for presentation in the video-presentation request. As discussed above, the target audience specification specifies one or more characteristics of users of the online system 140 eligible to be presented with the video and is used to identify users having user profile information, edges, and/or actions (i.e., metadata of the users) satisfying the target audience specification. Accordingly, the user selection module 320 accesses the one or more characteristics of users from the user profile store 210, the action log 230, and/or the edge store 250. The user selection module 320 compares the retrieved user profile information, edges, or actions of users with the target audience specification. The user selection module 320 selects the user when at least some of the elements of the user profile information, edges, or actions of a user match the target audience specification.

The user sampling module 330 generates a sample subset of users from the target audience. In some embodiments, the target audience is sampled based on a specified (e.g., pre-determined) sampling criterion. In such embodiments, the target audience is sampled at a specified sampling rate of 1/M (where M is an integer or positive rational number)—such that, every M-th user of the target audience is sampled or selected for inclusion in the sampled subset. For example, one out of every 1000 users is sampled.

The video reach count module 340 estimates a total video reach count for the video by extrapolating a sampled video reach count for the sampled subset of users to the target audience. The video reach count module 340 generates the sampled video reach count by determining whether each of the sampled users would have viewed the video for at least a pre-determined threshold duration. The pre-determined threshold duration may be provided by the third party system 130 or determined by the online system 140. In some embodiments, the pre-determined threshold duration is 6 seconds.

The video reach count module 340 uses a video view prediction model 355 trained by the machine learning module 350 to determine whether a sampled user would have viewed the video for at least the threshold duration. The machine learning module 350 applies machine learning techniques to train the video view prediction model 355. When applied to the sampled user, the video view prediction model 355 outputs an indicator of whether the sampled user would have viewed the video for at least the threshold duration. In one embodiment, the indicator output from the video view prediction model 355 is a percentage from 0% to 100%, the percentage indicating probability that the sampled user would have viewed the video for at least the threshold duration. The output from the video view prediction model 355 can be in other forms indicating a probability that the sampled user would have viewed the video for at least the threshold duration.

As part of the training of the video view prediction model 355, the machine learning module 350 forms a training set of online system users. In some embodiments, the training set includes a positive training set of online system users that have been determined to view videos from third party systems for at least the threshold duration and a negative training set of online system users that have been determined to view videos from third party systems for less than the threshold duration. In one embodiment, the online system users in the training set may be selected based on at least in part on the demographic information or other types of description information of the online system users.

The machine learning module 350 extracts feature values from the online system users of the training set, the features being variables deemed potentially relevant to whether or not the online system users have been determined to view videos from third party systems for at least the threshold duration. A list of example features is discussed below in conjunction with FIG. 4. Turning now to FIG. 4, FIG. 4 shows a list of features extracted by a machine learning module 350 of the video prediction module 270, in accordance with an embodiment. There are 17 features listed in FIG. 4, each feature having an ID 420, standard deviation 440, mean 450, and coverage 460. The mean 450 for each feature is the mean of example values of the feature from an example set of the training set. Also, the features are listed in the order of decreasing importance 470 (i.e., relevance). The importance 470 for each feature is shown by a bar. A longer bar indicates that the corresponding feature is more relevant to whether or not the online system users have been determined to view videos from third party systems for at least the threshold duration. The importance 470 of a feature affects the weight of the feature and/or some other measures of the feature when the feature is input into the video view prediction model 355. For example, a higher importance corresponds with a higher weight for the feature. In other embodiments, the machine learning module 350 may extract additional, fewer, or different features for training the model.

The ID 420 of each feature identifies the feature. For example, 1914 represents user 10-second conversion rate (CVR) for auto-play videos over last 90 days. The conversion rate is the total number of conversion outcomes for a content item divided by the total number of displays or presentations of the content item. In some embodiments, a measure of conversion outcome for a content item represents a total number of user interactions or conversions of the content item performed by users to whom the content item is displayed or presented. Examples of conversion events include clicks on the content item, interactions with the provider of the content item, views of a webpage provided in the content item, shares of the content item with other users, bookmark requests received for the content item, and the like. The conversion events can be retrieved from the action log 230.

FIG. 4 also shows standard deviation and mean of feature values for some features. For example, the mean of user age bucket (ID 19) is 2.9993 and the standard deviation of user age bucket is 1.0375. There are features that do not have feature values, such as user country bucket (ID 18), account-level vertical (ID 10037), and new page type (ID 187). The coverage of a feature indicates how many online system users in the training set are associated with the feature. For example, the feature of user country bucket (ID 19) has a coverage of 100%, indicating all online users in the training set is associated with a country.

An ordered list of the features for an online system user is herein referred to as the feature vector for the online system user. There may be multiple feature vectors for an online system user, each feature vector including one or more of the features described in FIG. 4. Some online system users may miss one or more features, which can still be included with a null value. In one embodiment, the machine learning module 350 applies dimensionality reduction (e.g., via linear discriminant analysis (LDA), principle component analysis (PCA), or the like) to reduce the amount of data in the feature vectors for online system users to a smaller, more representative set of data.

Turning back to FIG. 3, the machine learning module 350 uses machine learning to train the video view prediction model 355, with the feature vectors of the positive training set and in some embodiments, the negative training set serving as the inputs. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments. The video view prediction model 355, when applied to the feature vector extracted from a sampled user, outputs an indication of whether the sampled user would have viewed a video for at least the threshold duration, such as a scalar value representing a probability.

In some embodiments, a validation set is formed of additional online system users, other than those in the training sets, which have already been determined to have or to lack the property in question. The machine learning module 350 applies the trained validation model to the online system users of the validation set to quantify the accuracy of the video view prediction model 355. Common metrics applied in accuracy measurement include: Precision=TP/(TP+FP) and Recall=TP/(TP+FN), where precision is how many outcomes the video view prediction model 355 correctly predicted (TP or true positives) out of the total it predicted (TP+FP or false positives), and recall is how many outcomes the video view prediction model 355 correctly predicted (TP) out of the total number of online system users that did view videos from third party systems for at least the threshold duration (TP+FN or false negatives). The F score (F-score=2*PR/(P+R)) unifies precision and recall into a single measure. In one embodiment, the machine learning module 350 iteratively re-trains the video view prediction model 355 until the occurrence of a stopping condition, such as the accuracy measurement indication that the model is sufficiently accurate, or a number of training rounds having taken place.

The video reach count module 340 determines whether a sampled user would have viewed the video for at least the threshold duration based on output of the video view prediction model 355. For example, when the output of the video view prediction model 355 is a percentage, the video reach count module 340 determines that the sampled user would have viewed the video for at least the threshold duration if the percentage is no less than a threshold percentage, e.g., 50%. In response to the determination that a sampled user would have viewed the video for at least the threshold duration, the video reach count module 340 includes the sampled user as part of a sampled video reach count. In response to the determination that a sampled user would not have viewed the video for at least the threshold duration, the sampled user is excluded from the video view count. The video reach count module 340 extrapolates the sampled video reach count for the subset of users to the target audience to estimate a total video reach count for the video. In one embodiment, the extrapolation includes multiplying the sample video view count with the inverse of the specified sampling rate (e.g., [sample video view count]×1/[sampling rate]). For example, if the sample video view count is 500 and the sample rate is 1/1000, the total video reach count equals to 500×1/(1/1000)=500,000.

In embodiments where the video view prediction model 355 is used to predict an individual view count for each sample user, a sampled video view count for the subsets of users can be determined by aggregating the individual view counts of each of the subset of users. Further, the sampled video view count for the subset of users can be extrapolated to the target audience to estimate a total video view count for the video. The total video view count indicates how many times the video would have been viewed for at least the threshold duration by the target audience.

The prediction application module 360 applies the total video reach count estimated by the video reach count module 340 to determine a parameter of presenting the video. In one embodiment, the parameter is population size of the target audience of the video. In some embodiments, the prediction application module 360 sends the total video reach count to the third party system 130 for an adjustment in the video-presentation request or other parameters, e.g., a video presentation compensation value that the third party system 130 compensates the online system 140 for presenting the video.

Figure 5:
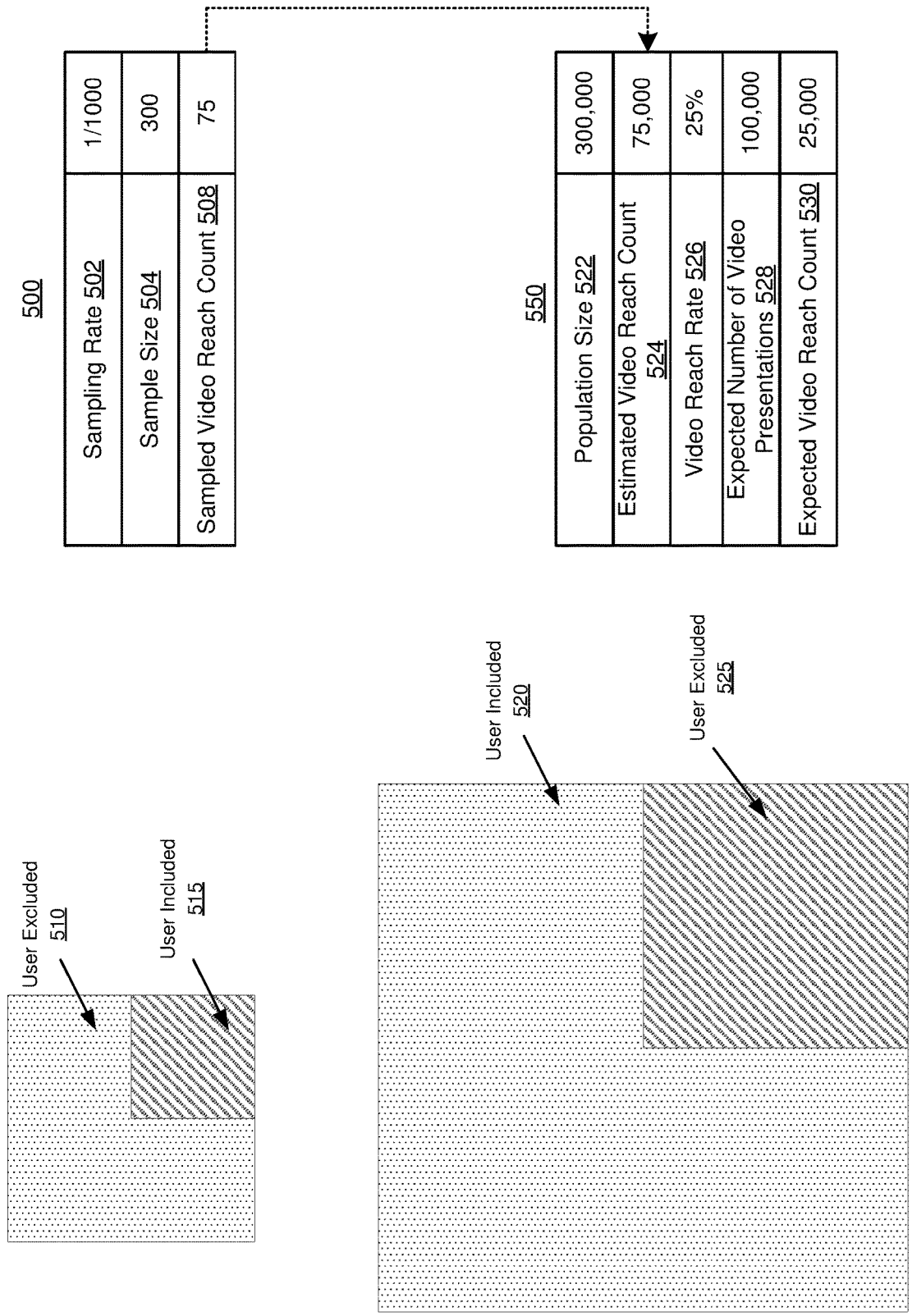
FIG. 5 is an example illustration showing estimation of a total video reach count for a video by extrapolating a sampled video reach count for a sample subset of users to a target audience of the video, in accordance with one embodiment.

FIG. 5 is an example illustration showing an estimation of a total video reach count for a video by extrapolating a sampled video reach count for a sample subset of users to a target audience of the video, in accordance with one embodiment. Table 500 lists information of the sample subset of users, including a sampling rate 502, a sample size 504, and a sampled video reach count 508. Table 550 lists information of the target audience, including a population size 522, an expected video reach count 524, an empirical video view rate 526, an expected number of video presentations 528, and an expected video view value 530.

The sampling rate 502 is obtained from a specified or predetermined sampling rate that was used to select the sampled subset of users from the target audience of the video. In some embodiments, the sampling rate 502 is calculated based on relative sizes of the sample population and the target population—as a ratio of sample size 504 to population size 522. Because the sample size 504 is 300 and the population size 522 is 300,000, the sampling rate 502 is 300/300,000, which equals to 1/1000. The sampled video reach count 508 for the sample subset of users is 75, meaning that 75 sampled users are included in the sampled video reach count. Accordingly, the rest of the sampled users are excluded because it is determined that they would not have viewed the video for at least a threshold duration.

520 and 525 shows the portions of included and excluded users in the whole population size, which are 510 and 515 times 1000, respectively. The estimated video reach count 524 is calculated based on extrapolation of the sampled video reach count 508 to the target audience, i.e., multiplying the sampled video reach count divided by the inverse of the sampling rate (75×1000=75,000).

The video reach rate 526 is the ratio of the number of users predicted to view the video for more than six seconds (or any other threshold duration) to the number of users that the video is simply presented to. In the embodiment of FIG. 5, the video view rate 526 is the ratio of 1) estimated video reach count 524 to 2) the population size 522, which equals to 25%. In some embodiments, a third party system 130 provides the number of users to whom the online system 140 presents the video, i.e., the expected number of video presentations 528. Alternatively, a third party may provide one or more criteria, such as a video presentation compensation value, based on which the online system 140 determines the expected number of video presentations 528. The online system 140 can further determine the expected video reach count 530 by multiplying the expected number of video presentations 528 by the video view rate 526 (100,000×20=20,000).

Figure 6:
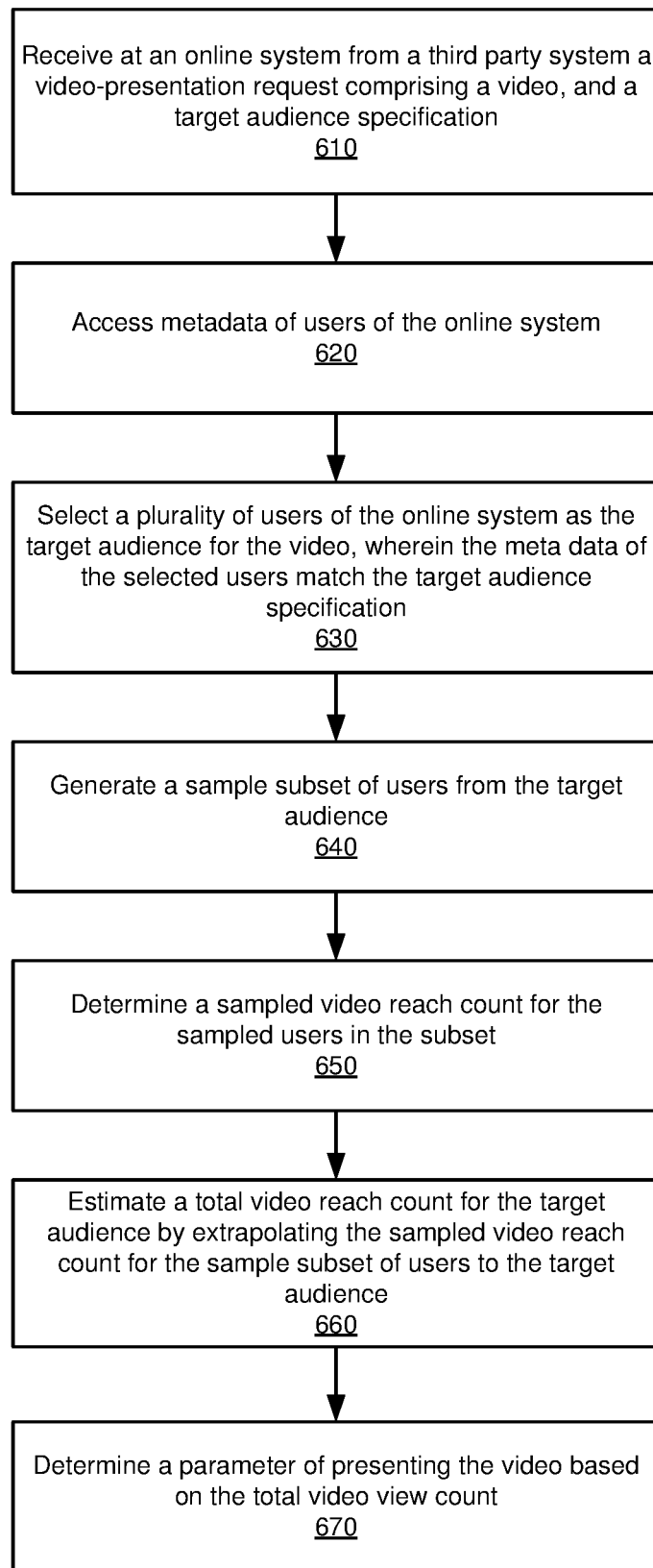
FIG. 6 is a flowchart of a process for estimating a total video reach count for a video based on a video-presenting request from a third party, in accordance with one embodiment.

FIG. 6 is a flowchart of a process for estimating a total video reach count for a video based on a video-presenting request from a third party, in accordance with one embodiment. In some embodiments, the process is performed by the video view prediction module 270 of the online system 120, although some or all of the operations in the method may be performed by other entities in other embodiments. In some embodiments, the operations in the flow chart are performed in a different order and can include different and/or additional steps.

The video view prediction module 270 receives 610 at the online system 140 from a third party system 130 a video-presentation request comprising a video, a video presentation period and a target audience specification. The video-presentation request can be stored in a content store 220 of the online system 140. The video view prediction module 270 accesses 320 metadata of users of the online system. In some embodiments, the metadata of the users are stored in a user profile store 210, a content store 220, and/or an edge store 250 of the online system 140. The video view prediction module 270 selects 630 a plurality of users of the online system as the target audience for the video, wherein at least part of the metadata of the selected users match the target audience specification. The video view prediction module 270 generates 640 a sample subset of users from the target audience according to a predetermined sampling criterion. The video view prediction module 270 determines 650 a sampled video reach count for the sampled users in the subset. The generation of the sampled video reach count comprises a determination of whether each sampled user would have viewed the video for at least a threshold duration. The determination is based on a video view prediction model 355 trained by using machine learning in one embodiment (e.g., by machine training module 350). The video view prediction module 270 estimates 660 a total video reach count for the video by extrapolating the sampled video reach count for the sample subset of users to the target audience of the video. For example, the total video reach count is the product of the sampled video reach count times divided by the ratio of the sample subset of users in the target audience. The video view prediction module 270 determines 670 a parameter of presenting the video based on the total video view count, such as population size of the audience of the video.

Guaranteed Delivery of Videos

Figure 7:
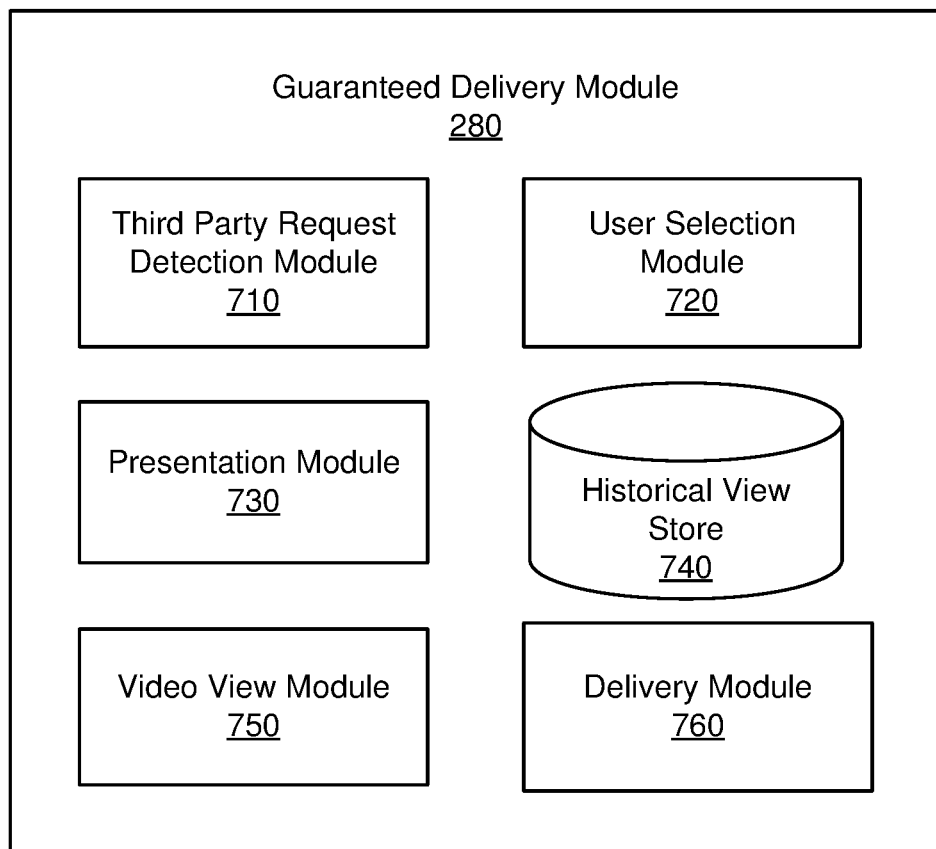
FIG. 7 is a block diagram illustrating a detailed view of a guaranteed delivery module of the online system, in accordance with an embodiment.

FIG. 7 is a block diagram illustrating a detailed view of a guaranteed delivery module 280 of the online system 140, in accordance with an embodiment. The guaranteed delivery module 280 shown in FIG. 7 includes a third party request detection module 710, a user selection module 720, a presentation module 730, a historical view store 740, a video view module 750, and a delivery module 760. In other embodiments, the guaranteed delivery module 280 may include additional, fewer, or different components for various applications. In some embodiments, the functions are distributed among the modules in a different manner than described herein. Moreover, the functions are performed by other entities in some embodiments.

The third party request detection module 710 detects and retrieves video-presentation requests from the third party system 130 similar to the third party request detection module 310 of the video view prediction module 270. A video-presentation request comprises a video, a video presentation period, and a target audience specification. The third party request detection module 710 sends information in the video-presentation request to one or more other modules of the guaranteed delivery module 280 for processing the video-presentation request. For example, the third party request detection module 710 sends the target audience specification to the user selection module 720, the video and video presentation period to the presentation module 730.

Based on the target audience specification, the user selection module 720 selects a plurality of users of the online system 140 as the audience of the video for presentation in the video-presentation request in a way similar to the user selection module 320 of the video view prediction module 270. In one embodiment, the user selection module 720 further filters the selected users, e.g., based on a determination of likelihood of whether the third party system 130 would have won an impression opportunity presented to the selected users, e.g., by a bid value provided by the third party system 130. Any selected users for whom the third party system 130 would not have won an impression opportunity may be filtered out. The determination of likelihood can be based on historical data of the selected users. For example, the online system 140 may use the prior bid success rate for the third party system 130 for prior presentations of content to users sharing characteristics with the selected users. The presentation module 730 sends instruction to the web server 290 to present the video to each selected user for a duration of time equal to the video presentation period. The selected plurality of users may play the video at a client device 110, e.g., through the web server 290. It is noted that each selected user plays the video, constituting a view of the video, but the duration of a view can vary from zero seconds to the length of time of the whole video. A selected user may view the video for more than one time.

The historical view store 740 stores a view history of the selected users. The view history of a selected user includes one or more historical views of the video included in the video-presentation request by the selected user. In one embodiment, the view history is based on video play statistics sent from the client devices 110, as discussed above. The video play statistics include information indicating which videos were played, how long a video was played, what time a video was played, and so on. For example, the client devices 110 upload the video play statistics to the webserver 290; and information in the video play statistics is stored in the historical view store 740. A historical view is a previous play of the video by a selected user. Each historical view is associated with information regarding the user's interaction with the video, such as a duration of time that the selected user played the video. A historical view can be associated with other type of information, such as an identifier for the video and an identifier for the selected user. Based on those identifiers, the historical view store 740 relates historical views to videos and online system users. For example, the historical view store 740 stores historical view entries, each historical view entry identifies the corresponding video and user and indicates a duration of time the user played the video.

The video view module 750 generates a video view value for the selected users. The video view value is an aggregation of individual view values for each of the selected user. To determine an individual view value for a selected user, the video view module 750 retrieves historical views of the selected user and determine whether the selected user played the video for at least a threshold duration in each historical view. Responsive to determination that the selected user played the video for at least a threshold duration in a historical view, the video view module 750 includes the historical view as part of the individual view value for the selected users. Likewise, responsive to determination that the selected user did not play the video for at least a threshold duration in a historical view, the video view module 750 excludes the historical view as part of the individual view value for the selected users. Thus, the individual view value is less than or equal to the number of historical views of the video by the selected user.

The video view module 750 aggregates the individual view values of each of the selected plurality of users to generate the video view value. In one embodiment, the video view value is the sum of all the video view values for the selected plurality of users. The individual view values and the video view value for the selected plurality of users are stored in the historical view store 740.

The delivery module 760 uses the video view value for modifying a pacing of delivery of the video. For example, the delivery module 760 compares the video view value with a video view limit. The video view limit is determined either by the third party system 130 or the online system 140 based on one or more factors. If the video view value is larger than the video view limit, the delivery module 760 instructs the presentation module 730 to delivery (i.e., present) the video to fewer online system users, such as only to a subset of the selected users. Alternatively, the delivery module 760 may instruct the user selection module 720 to select fewer online system users (not just selected users) as the audience of the video. However, if the video view value is smaller than the video view limit, the delivery module 760 instructs the user selection module 720 to select a larger group of online system users as audience of the video and instructs the presentation module 730 to present the video to the larger group of online system users. In some embodiments, the delivery module 760 may instruct the presentation module 730 to present the video for a duration of time that is more or less than the video presentation period in the video-presentation request. One factor is a video presentation compensation value, i.e., a monetary value to compensate the online system for presenting the video. In one embodiment, the video view limit is proportional to the video presentation compensation value.

In some embodiments, the delivery of the video is paced on a daily basis. For example, the video view module 750 generates a video view value for a day. The delivery module 760, based on the video view value, paces delivery of the video for the next day. For example, if the daily video view limit is 1000 and yesterday's video view value is 1100, the delivery module 760 determines to present the video to fewer online system users today, e.g., 90% of the online system users than the number of users that the video was presented to yesterday. Similarly, if today's video view value is 900, the delivery module 760 may determine to present to video to more online system users tomorrow. In one embodiment, the daily video view limit can be specified by the third party system 130 and this limit received by the online system 140. Alternatively, the third party system 130 may provide a target video view value which is received by the online system 140 for a campaign, and the daily video view limit is determined by the online system 140 dividing the target video view with the number of days of the campaign. In another embodiment, the daily video view limit is determined by operators of the online system 140.

Thus, the pacing based on video view guarantees delivery of the video over a period of time. And since the system is pacing on video views, in this case the system pacing not according to how many times online system users will receive it but how many times online system users will receive and actually view the video. Thus, the video view value reflects how many times online system users, to whom the video was presented, actually viewed the video, as opposed to merely skipping the video or unintentionally accessing the video. Based on the video view value, the online system can strategize presentation of the video to guarantee delivery of the video to an expected number of online system users.

The video view value may also be used to an adjustment in the video presentation request. For example, the video view value is sent to the third party system 130 to adjust the period of time for presenting the video or the target audience specification in the video presentation request. In one embodiment, the third party system 130 increases the period of time for presenting the video when the video view value is lower than an expected value. The third party system 130 may change the target audience specification for a bigger audience for the video. Likewise, when the video view value is lower than an expected value, the third party system 130 may decrease the period of time and/or change the target audience specification for a smaller audience for the video.

FIG. 8 is an example illustration showing generation of a video view value for a video, in accordance with one embodiment. FIG. 8 includes seven online system users: user A-G. Table 800 lists the determination of an individual view value for user A. User A has eight historical views 804: a-h, of the same video. Each historical view is associated with a duration that user A played the video, which is compared with the threshold duration, 10 seconds. For example, the duration that user A played the video for historical view a is 5 seconds, which is less than the threshold duration. Thus, historical view a is not included in the individual view value for user A. The duration that user A played the video for historical view b is 50 seconds, which is more than the threshold duration. Thus, historical view b is included in the individual view value for user A. Accordingly, the individual view value for user A is 5.

The individual view values of the other six users are determined in the same way. Table 850 lists the individual view values for each of the users A-G. For example, the individual view value for user B is 12; versus 7 for user C, 8 for user D and 10 for user E. In the embodiment of FIG. 8, the video view value equal to the sum of the individual view values. Thus, the video view value of the video is 42. All the data shown in FIG. 8 are stored in the historical view store 740.

Figure 9:
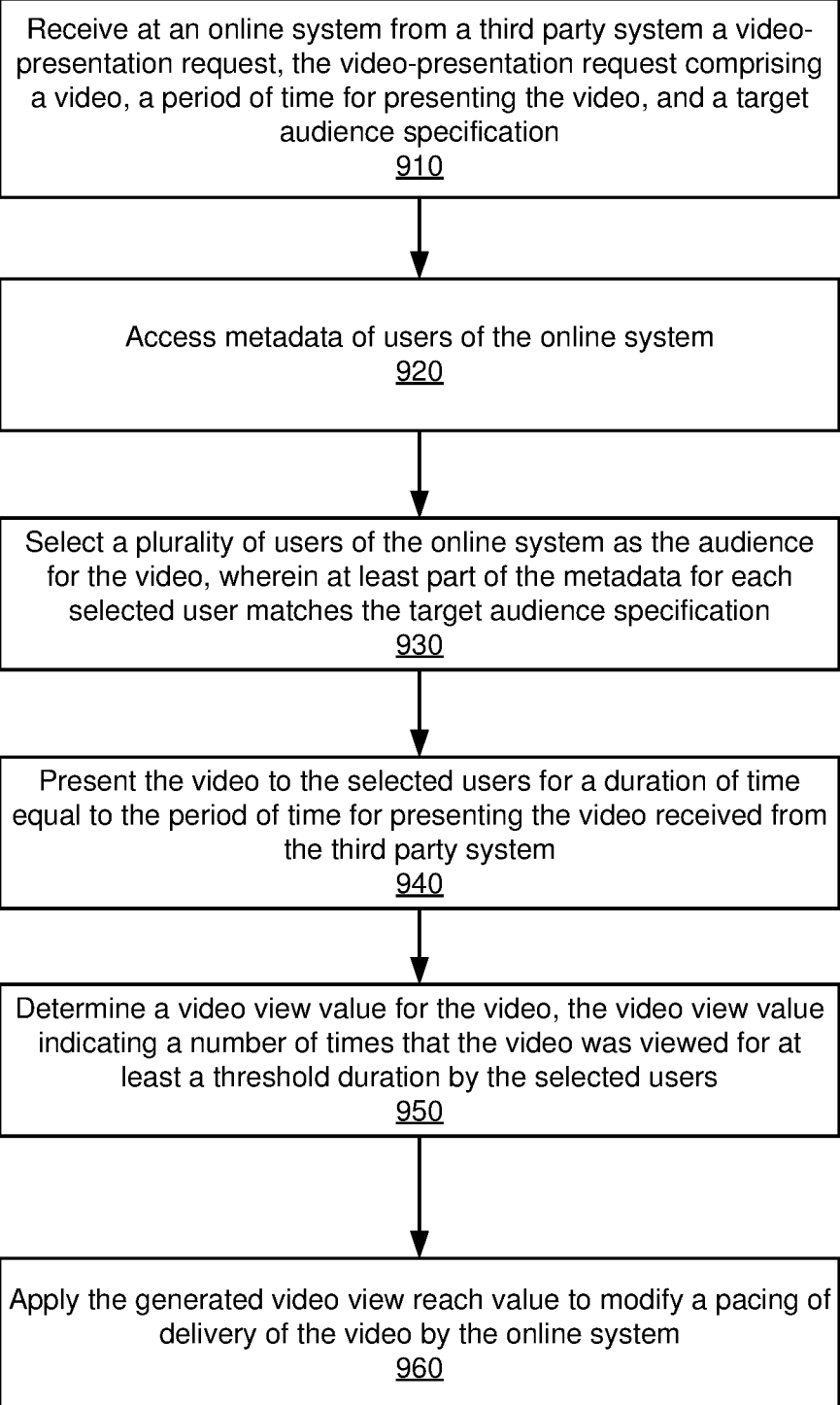
FIG. 9 is a flowchart of a process of generating a video view value for a video for guaranteed delivery of the video by the online system, in accordance with one embodiment.

FIG. 9 is a flowchart of a process of generating a video view value for a video for guaranteed delivery of the video by the online system, in accordance with one embodiment. In some embodiments, the method is performed by the guaranteed delivery module 280 of the online system 120, although some or all of the operations in the method may be performed by other entities in other embodiments. In some embodiments, the operations in the flow chart are performed in a different order and can include different and/or additional steps.

The guaranteed delivery module 280 receives 910 from a third party system 130 a video-presentation request, the video-presentation request comprising a video, a video presentation period, and a target audience specification. The guarantee delivery module 280 accesses 920 metadata of users of the online system 140 and selects 930 a plurality of users of the online system as the audience for the video, wherein at least part of the metadata for each selected user matches the target audience specification. The guarantee delivery module 280 presents 940 the video to the selected users for a duration of time equal to the video presentation period received from the third party system. The guarantee delivery module 280 stores each previous view/play of the video by the user as a historical view in a historical view store 740. Each historical view is associated with a duration that the user played the video, which varies from 0 second to the length of time of the whole video.

The guaranteed delivery module 280 determines 950 a video view value for the video. The video view value indicates a number of times that the video was viewed for at least a threshold duration by the selected users. The guaranteed delivery module 280 applies 960 the generated video view value to modify a pacing of delivery of the video by the online system 140. In one embodiment, delivery of the video is paced on a daily basis. For example, a video view value of each day is compared with a daily video view limit. When the video view value is smaller than the daily video view limit, the video will be presented to more online system users in the next day. Additionally, the video will be presented to more online system users in the next day if today's video view value is larger than the daily video view limit.

Other Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
  selecting a plurality of users of an online system as a target audience of a video based on at least part of user profiles of a selected plurality of users that are maintained by the online system;
generating a sample subset of users from the target audience based on a sampling rate;
determining a sampled video reach count for the sampled users in the sample subset by determining whether the sampled users would view the video for at least a threshold duration if the video was presented to the sampled users;
estimating a total video reach count for the target audience by extrapolating the sampled video reach count for the subset of users to the target audience, wherein extrapolating the sampled video reach count for the subset of users to the target audience comprises multiplying the sampled video reach count with an inverse of the sampling rate; and
providing the video for display to users of the online system based on the total video view count.

2. The method of claim 1, wherein determining whether the sampled users would view the video for at least a threshold duration if the video was presented to the sampled users comprises:
determining whether each of the sampled users would have viewed the video for at least the threshold duration; and
in response to determination that a sampled user would have viewed the video for at least the threshold duration, including the sampled user as part of the sampled video view count.

3. The method of claim 2, wherein determining whether each of the sampled users would have viewed the video for at least the threshold duration comprises:
determining a probability that the sampled user would view the video for at least the threshold duration by applying a trained model to a plurality of features of the sampled user.

4. The method of claim 3, wherein each feature of the plurality of features is associated with a weight that indicates relevance of the corresponding feature to whether or not the sampled user would view the video for at least the threshold duration and the weight of each feature of the plurality of features is applied to the trained model to determine the probability.

5. The method of claim 1, wherein determining a sampled video reach count for the sampled users in the sample subset comprises:
determining an individual view count for each of the sampled users; and
aggregating the individual view count of each of the subset of users.

6. The method of claim 1, wherein the total video view count indicates how many times the video would be viewed for at least the threshold duration by the target audience.

7. The method of claim 1, wherein providing the video for display to users of the online system based on the total video view count comprises:
determining a population size of an audience for the video based on the total video view count;
selecting the population size number of users of the online system; and
providing the video for display to the selected users.

8. A computer program product comprising a non-transitory computer readable storage medium having instructions encoded thereon that, when executed by a processor, cause the processor to:
select a plurality of users of an online system as a target audience of a video based on at least part of user profiles of a selected plurality of users that are maintained by the online system;
generate a sample subset of users from the target audience based on a sampling rate;
determine a sampled video reach count for the sampled users in the sample subset by determining whether the sampled users would view the video for at least a threshold duration if the video was presented to the sampled users;
estimate a total video reach count for the target audience by extrapolating the sampled video reach count for the subset of users to the target audience, wherein extrapolating the sampled video reach count for the subset of users to the target audience comprises multiplying the sampled video reach count with an inverse of the sampling rate; and
provide the video for display to users of the online system based on the total video view count.

9. The computer program product of claim 8, wherein the instructions that cause the processor to determine whether the sampled users would view the video for at least a threshold duration if the video was presented to the sampled users comprise instructions that cause the processor to:
determine whether each of the sampled users would have viewed the video for at least the threshold duration; and
in response to determination that a sampled user would have viewed the video for at least the threshold duration, include the sampled user as part of the sampled video view count.

10. The computer program product of claim 9, wherein the instructions that cause the processor to determine whether each of the sampled users would have viewed the video for at least the threshold duration comprise instructions that cause the processor to:
determine a probability that the sampled user would view the video for at least the threshold duration by applying a trained model to a plurality of features of the sampled user.

11. The computer program product of claim 10, wherein each feature of the plurality of features is associated with a weight that indicates relevance of the corresponding feature to whether or not the sampled user would view the video for at least the threshold duration and the weight of each feature of the plurality of features is applied to the trained model to determine the probability.

12. The computer program product of claim 8, wherein the instructions that cause the processor to determine a sampled video reach count for the sampled users in the sample subset comprise instructions that cause the processor to:
determine an individual view count for each of the sampled users; and
aggregate the individual view count of each of the subset of users.

13. The computer program product of claim 8, wherein the total video view count indicates how many times the video would be viewed for at least the threshold duration by the target audience.

14. The computer program product of claim 8, wherein the instructions that cause the processor to provide the video for display to users of the online system based on the total video view count comprise instructions that cause the processor to:
determine a population size of an audience for the video based on the total video view count;

select the population size number of users of the online system; and provide the video for display to the selected users.

15. A computer system comprising:

a non-transitory computer-readable storage medium storing executable computer program instructions, the computer program instructions comprising instructions that when executed cause a computer processor to perform steps, comprising:

selecting a plurality of users of an online system as a target audience of a video based on at least part of user profiles of a selected plurality of users that are maintained by the online system;

generating a sample subset of users from the target audience based on a sampling rate;

determining a sampled video reach count for the sampled users in the sample subset by determining whether the sampled users would view the video for at least a threshold duration if the video was presented to the sampled users;

estimating a total video reach count for the target audience by extrapolating the sampled video reach count for the subset of users to the target audience, wherein extrapolating the sampled video reach count for the subset of users to the target audience comprises multiplying the sampled video reach count with an inverse of the sampling rate; and providing the video for display to users of the online system based on the total video view count.

16. The system of claim 15, wherein determining whether the sampled users would view the video for at least a threshold duration if the video was presented to the sampled users comprises:

determining whether each of the sampled users would have viewed the video for at least the threshold duration; and in response to determination that a sampled user would have viewed the video for at least the threshold duration, including the sampled user as part of the sampled video view count.

17. The system of claim 16, wherein determining whether each of the sampled users would have viewed the video for at least the threshold duration comprises:

determining a probability that the sampled user would view the video for at least the threshold duration by applying a trained model to a plurality of features of the sampled user.

18. The system of claim 15, wherein determining a sampled video reach count for the sampled users in the sample subset comprises:

determining an individual view count for each of the sampled users; and aggregating the individual view count of each of the subset of users.

19. The system of claim 15, wherein the total video view count indicates how many times the video would be viewed for at least the threshold duration by the target audience.

20. The system of claim 15, wherein providing the video for display to users of the online system based on the total video view count comprises:

determining a population size of an audience for the video based on the total video view count;

selecting the population size number of users of the online system; and providing the video for display to the selected users.

* * * * *